Dec. 6, 1938.  H. P. BOSWAU  2,139,352
SUPERVISORY CONTROL SYSTEM
Original Filed May 27, 1932   4 Sheets-Sheet 1
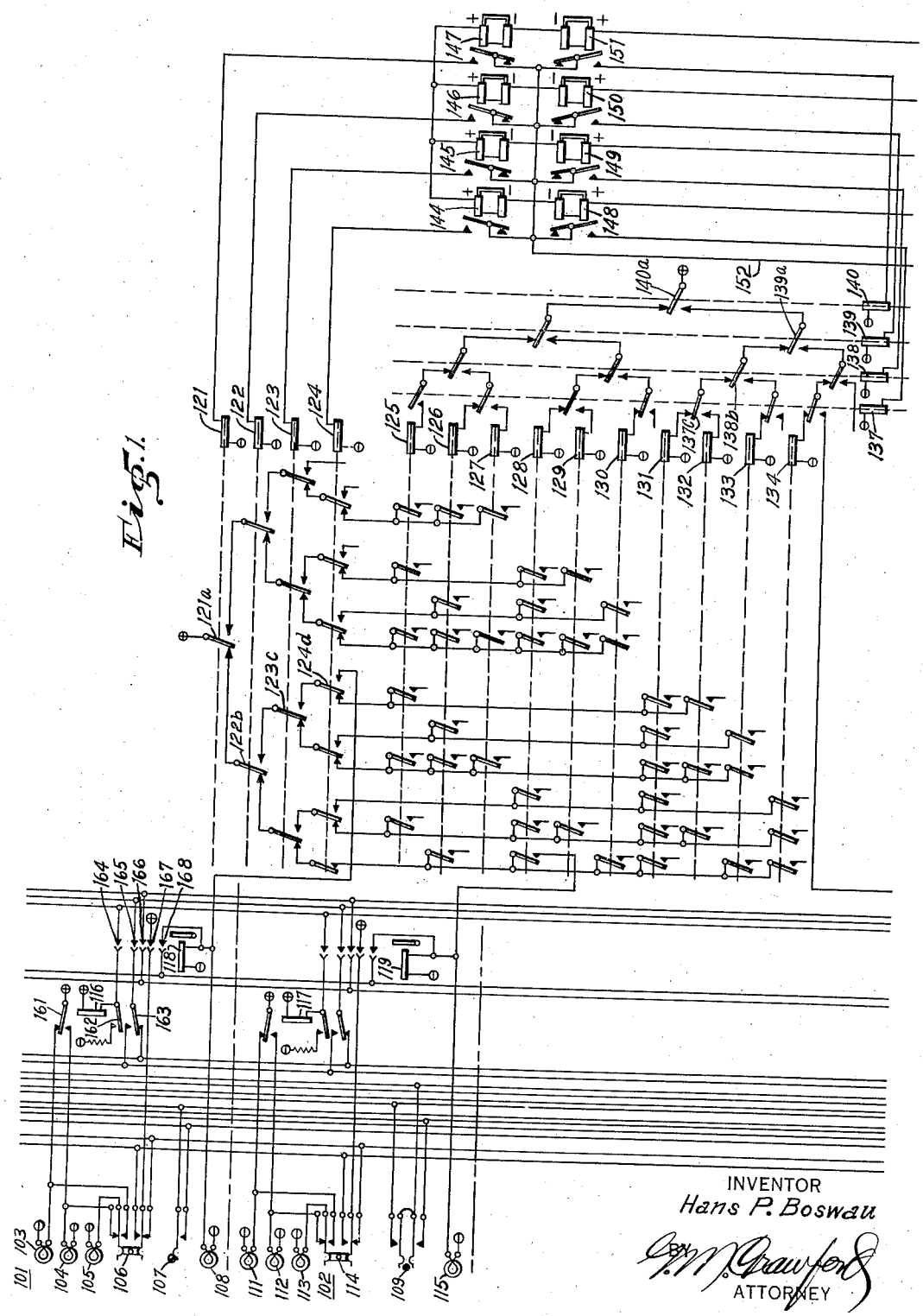
INVENTOR
Hans P. Boswau
ATTORNEY

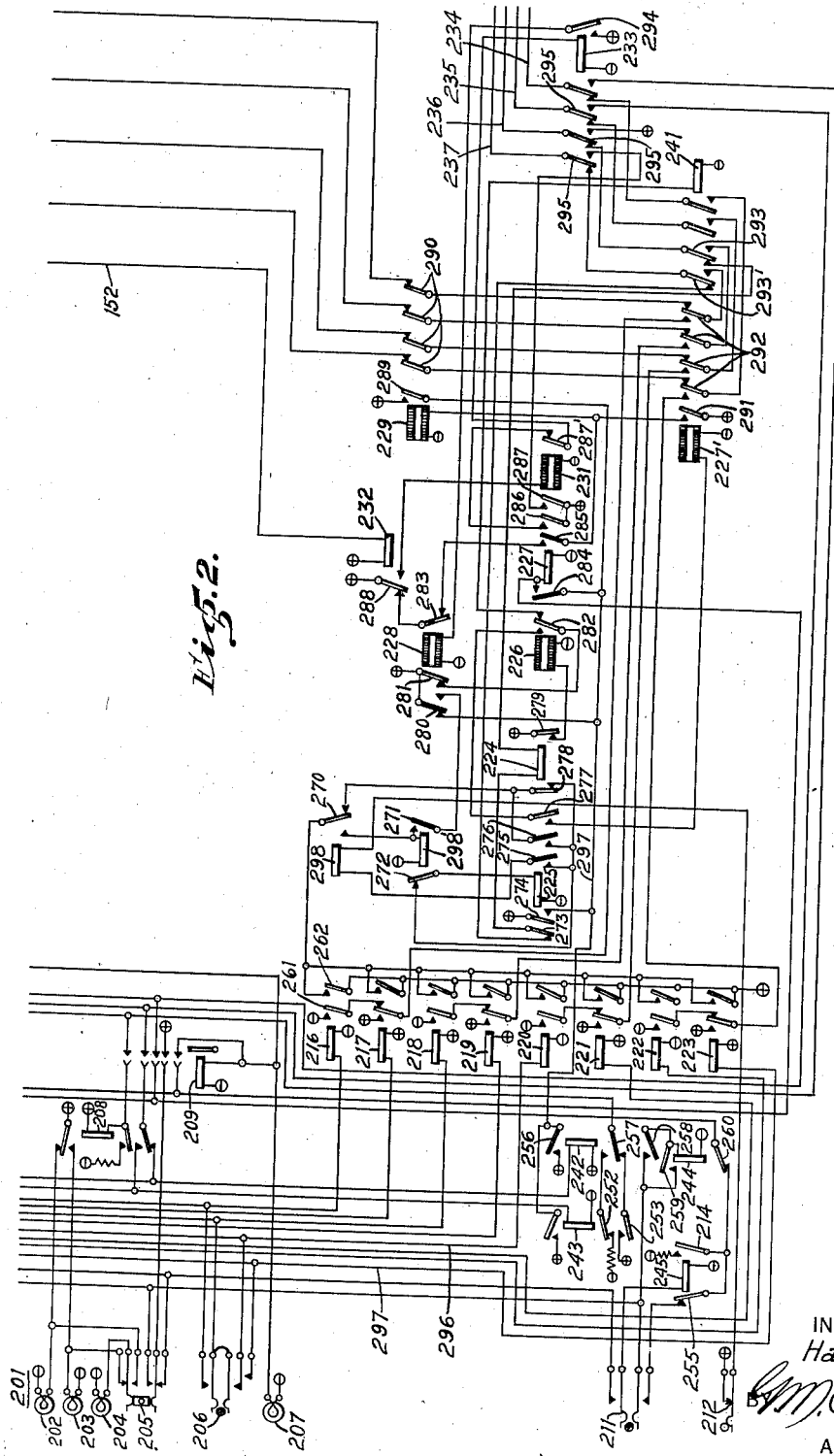

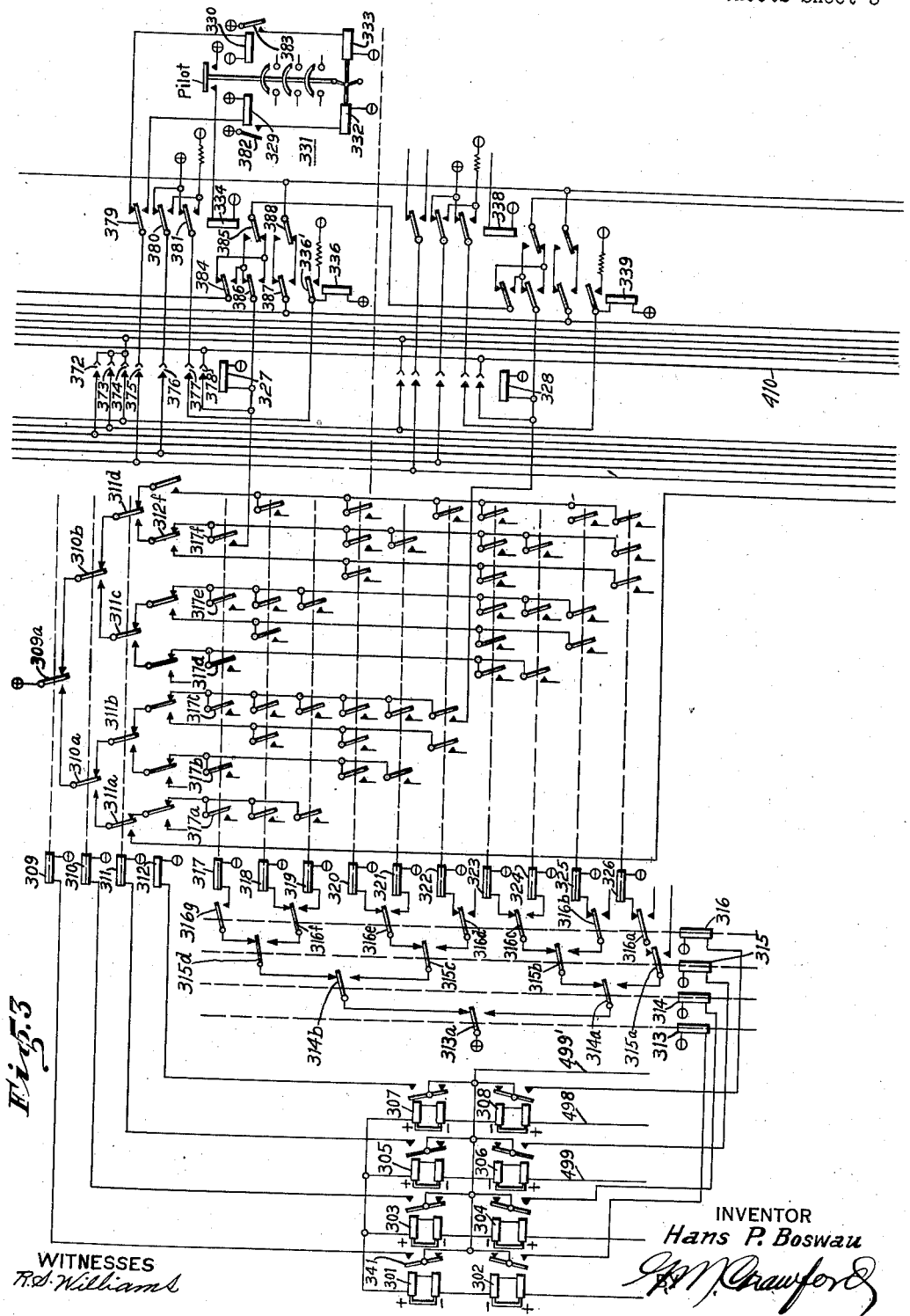

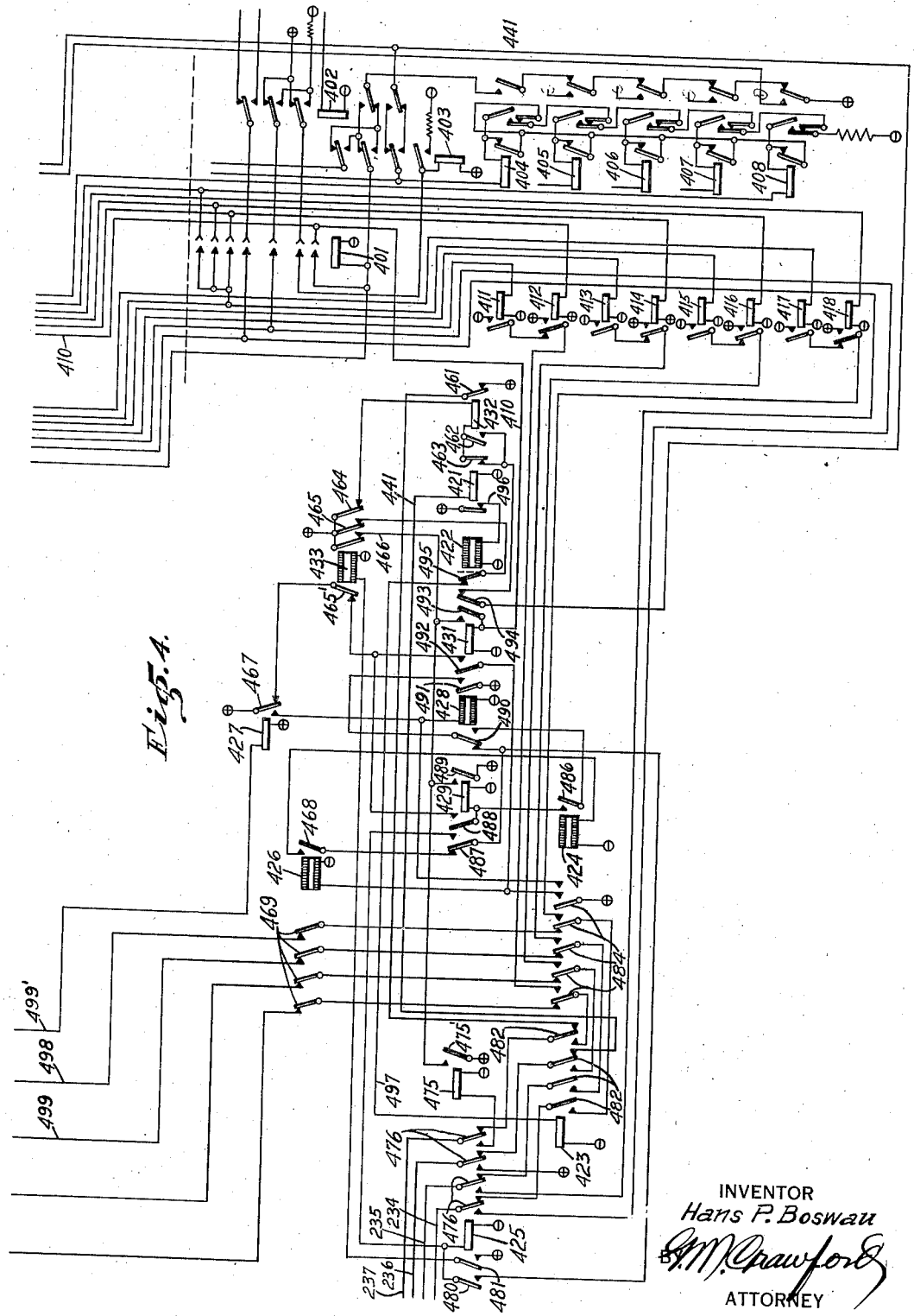

Patented Dec. 6, 1938

2,139,352

UNITED STATES PATENT OFFICE 2,139,352

SUPERVISORY CONTROL SYSTEM

Hans P. Boswau, Galion, Ohio, assignor to The North Electric Mfg. Company, a corporation of Ohio Application May 27, 1932, Serial No. 613,863
Renewed October 30, 1937

12 Claims. (Cl. 177—353)

My invention relates to signalling systems and more particularly to supervisory control systems in which a dispatcher located at a central dispatching point selectively controls a plurality of circuit breakers and other power apparatus units located at the remotely-disposed substation over a minimum number of wires.

Heretofore, supervisory control of remotely-disposed apparatus units has been accomplished in the case of code controlling systems, by means of the transmission of individual code combination of impulse conditions from the central dispatching office to the substation, a movable member at the dispatcher's office controlling the rate of transmission of the code combinations and a similar movable member at the substation operating in synchronism with the transmitting mechanism receiving and distributing the code combination of impulse conditions to selector mechanism which operates in response to these codes to select a unit for operation. As is well known, such code systems depend for accuracy of selection upon the synchronous operation of the code transmitter and the code receiver.

A second type of system known as the synchronous selection system provides synchronously-operating members such as chains of relays or rotatable members, which, as they operate in synchronism step by step, permit direct successive control of power apparatus units from the central station. In this system also as will be obvious the accuracy of operation depends upon the synchronous operation of the apparatus units.

Not only are the above described systems dependent upon synchronous operation of the transmitting and receiving apparatus, but an appreciable fixed time interval must invariably elapse from the starting of operation before the selected unit is reached for operation.

Supervisory control operations, although occurring a large number of times in any one system during a normal operating day, must, when such operations are to be made, operate with as great rapidity as possible because of the importance of each power operation. Accordingly, an instantaneous supervisory control system, i. e., a system operating in a fraction of a second, has long been sought.

I have as a main object of my invention, the provision of means for instantaneously supervising and controlling remotely disposed apparatus units from the central station over a direct current system.

A further object of my invention is to provide remote-selective control and supervision of apparatus units utilizing direct current selecting impulses with selecting mechanism which is independent of synchronously-operating apparatus.

Another object of my invention is to provide a code supervisory system which is instantaneous in operation, requires no synchronism, indicates the correctness of each selection made before the units in the selection can be operated by the dispatcher, all of these operations including the selection, checking of the selection, control and supervision being performed over four line wires.

A still further object of my invention is to provide a code-operating supervisory control system in which the code comprises a single undivided impulse over a plurality of line wires.

A further object of my invention is to provide a code-operated supervisory control system in which direct control of a selected unit may be obtained.

There are other objects of my invention which together with the foregoing will appear in the detailed description which is to follow.

The supervisory control system described herein and shown on the drawings forming a part of this application permits the selection of any one of fifty points over four line wires in substantially instantaneous operation. No stepping or successive operations of counting relays is required, one single and undivided impulse over the four line wires being sufficient to select the desired point.

For an operation the dispatcher depresses a non-locking point-selecting key until he is informed by the glowing of a point-selecting lamp that the desired point is connected to the line wires and ready for the reception of an operation. The point-selecting key is then released and the desired operation performed by means of the individual control key and the common-operation control key as will be described. After the operation is performed the connection may be released by depressing the release key or by depressing another point-selecting key preparatory to the performance of a second operation.

In normal conditions an operating circuit, extending to both the dispatcher's office and to the remote substation at which the units to be controlled are located, is held in readiness for operation over a circuit through two of the line wires and a relay at each end in series. As soon as an operation is initiated from the dispatcher's end or a supervisory indication originates from the substation, this normal circuit is opened in order to disconnect the starting relay at the end which is to act as the receiving end in the succeeding function. By this means interference is effectively prevented when both ends attempt to initiate a selection simultaneously.

If the dispatcher originates the selection a single impulse is transmitted from the office to the substation after the normal circuit has been opened. A different combination of positive and negative battery is applied to the four line wires for each of the fifty points, thereby energizing the selection relay of the desired point at the substation, through intermediate code receiving relays.

When the point-selection relay at the substation is energized, it sends a second single impulse back to the dispatcher's office where this impulse in turn causes the operation of the proper point-selecting relay at the dispatcher's office. The polarity combination of the returned impulse is preferably different from that of the first impulse in order to provide double insurance that the proper relay has been selected at the substation. Simultaneously with the operation of the point-selection relay at the office, the associated point-selection lamp is caused to glow, thus informing the dispatcher that the selection has been completed and is correct.

If, for any reason, a point-selection relay, other than the desired one, has been selected at the substation, a polarity combination will be returned to the office which will cause the glowing of a point-selection lamp not associated with the originating point. If, on the other hand, the correct point-selection relay has been operated at the substation, but the return impulse fails to energize the correct point-selection relay at the office, the point selection of the originating lamp will not glow, but that of another point.

Therefore, if the dispatcher sees the point selection lamp of the selected point glow, he is assured that the established connection is correct. The only possibility for an error in this indication would be the simultaneous occurrence of two separate and dissimilar faults in the impulses, one of which would cause the operation of a wrong selection relay at the substation while the second failure in the return impulse would have to be such that the first error is rectified. The probability of two distinct faults one of which must have a definite relation to the other, occurring at the proper time is so extremely remote that it may be safely disregarded particularly if the polarity combination of the return impulse is different from that of the first impulse.

The point-selection relays remain energized and two of the line conductors are connected through to the individual point equipment for control and supervision while the remaining two line wires are utilized to maintain the connection until either the release key or another point-selection key is depressed and an alarm may be provided to insure the release of the selection by the dispatcher.

If an automatic operation occurring at the substation is to transmit the corresponding supervisory indication to the office, the associated point-selection relay at the substation is energized in a local circuit. Thereafter a single group of impulses is sent to the office causing the operation thereat of the corresponding point selection relay. The control and supervisory line wires are then connected through and the supervisory indication transmitted to the office. The connection is maintained until the supervisory lamp at the office has actually changed to agree with the new position of the supervisory device whereupon the connection is automatically released and the circuit returns to its normal rest condition.

Referring to the drawings:

Figure 1 is a circuit diagram of the point-selecting and code-receiving apparatus located at the dispatcher's office.

Fig. 2 is a circuit diagram of the point-selecting and code-transmitting apparatus at the dispatcher's office.

Fig. 3 is a circuit diagram of the point-selecting and code-receiving apparatus at the substation, and Fig. 4 is a circuit diagram of the point-selecting and code-transmitting apparatus at the substation.

Before describing the apparatus in detail, a general description of the function of the various relays will first be given in order to make the subsequent operations described more obvious.

In Figure 1, the mechanism shown at 101 and 102 indicates the point selecting equipment employed and comprises a supervisory lamp 103 for indicating tripped conditions of an associated remote circuit breaker, a supervisory lamp 104 for indicating closed indication of the same breaker, a disagreement lamp 105 which, as will be described, is illuminated when the condition of the remote breaker does not agree with the position of the control key, a control key 106 which controls the operation of the selected unit, a point selecting key 107 which is of the non-locking push-button type and which controls the code transmission for a remote selection and the point selection lamp 108 which, when illuminated, indicates the remote selection which has been made to advise the dispatcher whether he is about to operate the correct unit.

It will be clear that the point-selecting equipment 102 is similar to that described in connection with the point-selecting equipment 101 with the exception of the point-selection key 109 which controls two contacts for a different code combination as will appear in more detail hereinafter. The same trip indicating lamp 111, closed indicating lamp 112, disagreement indicating lamp 113, operating control key 114 and point-selecting lamp 115, are provided.

Associated with each point-selecting position 101 and 102 are supervisory relays 116 and 117, respectively, which, as will appear hereinafter, are operated in accordance with a received code combination to control the circuits of the individual lamps 103 and 104, and 111 and 112, respectively. There are also provided for the selecting positions, point-selecting relays 118 and 119, respectively, which are operated in response to a received supervisory code combination of impulse conditions from the remote station for connecting the subsequent supervisory circuit to the individual supervisory relay such as 116 and 117, respectively.

The circuits for point-selecting relays 118 and 119 are in turn controlled by the joint operation of the armatures of relays 121 to 134 the circuits for relays 125 to 134 being controlled by relays 137 to 140. Relays 121 to 124 and relays 137 to 140 are controlled by the polar receiving relays 144 to 151 which relays, as will appear from the detailed description to follow, are operated in accordance with a received supervisory code of a remote selection or operation.

In Figure 2, a further point-selecting equipment 201 comprising a closed circuit condition lamp 202, a tripped circuit condition lamp 203, a disagreement indication lamp 204, operating key 205, point-selecting key 206 and point-selecting indicating lamp 207, is provided. It will be understood that, although three such point-selecting equipments 101, 102 and 201 is here disclosed, a much larger number extending at least to fifty such point selections may, if desired, be provided in my system. The point-selecting equipment 201 is also provided with the supervisory relay 208 and individual selecting relay 209, as in the above case. For all such point-selecting equipments, there is provided in addition, the common equipment comprising one operation control key 211 and a release key 212.

Relays 216 to 223 are operated in accordance with the particular point-selecting key which has operated to control the transmission of a selection code to the remote station. Connected in the normally closed holding line circuit is a line holding relay 224. A relay 225 operates in response to the depression of any one of the individual keys to open the normal circuit including the relay 224 for starting the apparatus into operation. A relay 226, which is of the slow-acting type, is controlled by the line relay 224 and in turn operates in conjunction with relay 225 to control the relay 227' which, at its armatures, functions to switch the signalling line extending from the remote station from the receiving code-responsive relays 144 to 151, in Fig. 1, to the code-transmitting relays 216 to 223 when a control code is to be transmitted. The relay 227 operates jointly with the slow-to-release relay 228 to control the slow-to-release relay 229 which opens the receiving supervisory circuit after the supervisory code has been received. To permit completion of the operation, relay 231 is controlled in turn by relay 232 which is operated in series with any one of the supervisory code responsive relays 121 to 124, or 137 to 140, when operated by the relays 144 to 151. Relay 231 also controls the relay 233, which switches the signalling lines 234 to 237 from the position shown to their alternate contacts for the final supervisory and control operations. Relay 241, jointly controlled by relays 226 and 228, further controls the switching operation of the signalling lines as will appear more fully hereinafter.

In addition to the above relays, other relay operations such as relays 242 and 243 controlled over the individual selecting point and relays 244 and 245, operated by the common operating key 211, will be described more fully hereinafter.

In Fig. 3, control code-responsive relays 301 to 308, operating in response to received control-code combinations, function to control relays 309 to 312, and 313 to 316. Relays 313 to 316 in turn control the circuit over a pyramid selection to the relays 317 to 326. Relays 309 to 312, and 317 to 326 function jointly to control, over a pyramid selection, individual point-selecting relays such as 327 and 328 which, in turn, close circuits to individual closing and tripping magnets 329 and 330 which function to control operating solenoids 332 and 333 of breakers such as breaker 331. Supervisory relay 334 individual to the circuit breaker 331, over its armatures, controls a supervisory circuit through the point selecting contacts of relay 327. Relay 336, also individual to the breaker 331, operates in response to an automatic operation for storing the supervisory code as will appear more fully hereinafter.

Although only one such breaker 331 is shown, it will be readily understood that other breakers, controlled by similar individual equipment such as relays 328 and relays 338 and 339, one equipment for each of the individual operating positions at the dispatcher's office, are provided in practice.

In Figure 4, further selective equipment is shown by the point-selecting relay 401 and relays 402 and 403 which are individual to a further selecting position as in the case of relay 327 and its associated circuit breaker equipment. Relays 404 to 408 are operated in a manner to be described in detail hereinafter to control the order of transmission of supervisory codes in the event of a simultaneous operation of more than one breaker. Relays 411 to 418 are operated in accordance with the breaker operation for controlling the code to be transmitted back to the dispatcher's office.

As in the case of the control office, a line relay 421 is provided which is normally held energized over the line and which is deenergized, as will appear hereinafter, either in response to an automatic operation or to the opening of a line in response to a control operation from the dispatcher's office. The relay 421 in turn controls the energizing circuit of the slow-release relay 422 which in turn controls the circuit of relay 423.

The relay 423, as will appear hereinafter, cooperates with relays 424 and 425 to control the switching of the signalling lines 234 to 237 from the control to supervision or check positions as the case may be. Relay 426 is operated to open the circuit to the supervisory-receiving relay following the operation of the supervisory equipment in a manner to be described. Relay 427 operates in response to the supervisory operation to control the energization of relay 428. Relay 429 is operated jointly by relays 428 and 424 in response to a supervisory operation for opening the supervisory line. In addition, relays 431, 432 and 433 function in a manner to be described in detail in connection with the actual operations which will now be described.

Normally an energizing circuit is completed for the line relay 224 at the dispatcher's office and line relay 421 at the substation which extends from negative battery at the substation through the winding of the line relay 421, conductor 441, through the back contact and armature 482, back contact and armature 476, over conductor 236, third armature 295 and its back contact, armature 293 and its back contact, through the winding of the relay 224, armature 273 and its back contact, back contact and armature 293', fourth back contact and armature 295, conductor 237, armature 476', and its back contact, the armature 482' and its back contact, armature 461 and its back contact to positive battery. Relays 224, at the office and 421, at the substation, are energized in series over this circuit.

Relay 224, at the office, as a result of its energization, holds the circuit of the slow-release relay 226 closed, at its armature 279, and at its armature 278, prepares an energizing circuit for the relay 225.

At the substation the energization of line relay 421 holds the energizing circuit of the slow-release relay 422 closed at armature 496 and at armature 463, prepares an energizing circuit for the relay 432.

It will be assumed that the dispatcher desires to control one of the remote circuit breakers, as for example, breaker 331. In order to operate the breaker he will depress the point-selecting key 107. When the point-selecting key 107 is depressed by the dispatcher, a predetermined combination of the relays 216 to 223 are energized preparatory to sending out the code combination individual to the selecting point associated with the depressed point-selecting key. In the present case, an energizing circuit is completed for relays 223 and 220 over a circuit from negative battery through the winding of the relay 220, conductor 296, through the contacts of key 107, conductor 297 and through the winding of the relay 223 to positive battery. Relays 220 and 223 are energized in series over this circuit and operate their armatures to their front contacts preparatory to transmitting a predetermined code combination.

As a result of the energization of relays 220 and 223, an energizing circuit is completed for the relay 225 from negative battery through the winding of the relay 225, armature 272 and its back contact, the front contact and armature 278, back contact and armature 270 and through the second armature and front contact of relay 220 or of relay 223 to positive battery. As a result of the energization of relay 225, this relay is locked over a circuit from negative battery through the winding of relay 225, armature 272 and its back contact, front contact and armature 276, back contact and armature 270 and over the second armature of either relays 220 or 223 to positive battery. Further results of the energization of relay 225 are to place positive on the conductor 297 at armature 274 and its front contact, to prepare a circuit for the relay 298 at armature 275, to prepare a circuit for relay 227' at armature 277 and to open the normal energizing circuit traced above for the line relays 224 and 421 at armature 273.

As a result of the latter operation, the line relays 224 and 421 are deenergized. Armatures 278 and 279 drop to their back contacts, the former, however, having no effect inasmuch as relay 225 which was originally energized over the front contact of armature 278 is now locked over its own armature 276 through the circuit traced above. The movement of armature 279 to disengage its contact, however, opens the energizing circuit of the relay 226, which is a slow-release relay and does not permit its armature to drop to its back contact for an interval of time thereafter.

During the period while the armature 282 is still in engagement with its front contact and armature 277 engages its front contact as a result of the energization of relay 225, as described above, an energizing circuit is completed for the relay 227' from negative battery through the winding of relay 227', front contact and armature 277, front contact and armature 282 and back contact and armature 281, to positive battery. Relay 227' is energized over this circuit and at its armature 291 completes an obvious energizing circuit for the relay 229, which upon energization moves its armatures 290 to disengage their back contacts which are connected, as described hereinbefore, to the supervisory code responsive relays 144 to 151 and these relays are, accordingly, temporarily rendered nonoperative in response to any operations occurring at this time. At armature 289, positive battery from a further source is supplied to the conductor 297 but this has no effect at this time.

A further result of the energization of relay 227' is to actuate its armature 292 which are associated with the signalling lines, from engagement with their back contacts extending through the armatures 290 to the supervisory code receiving relays, to their front contacts which extend to the contacts of the control code transmitting relays 216 to 223, in preparation for the transmission of the control codes. However, this code circuit is not completed at this time because of the position of the armatures 293 in engagement with their back contacts.

Upon the deenergization of the slow-release relay 226 as a result of the interruption of its energizing circuit when relay 224 was deenergized as described above, an energizing circuit is completed for the relay 241 from negative battery through the winding of the relay 241 back contact and armature 282 and back contact and armature 281 to positive battery. Relay 241, upon energization, operates its armatures 293 to engagement with their front contacts and the signalling lines 234 to 237 are finally extended through to the armatures of relays 216 to 223 for transmission of the control code to the substation.

During the period while the above described operations have been occurring at the dispatcher's office, the deenergization of the line relay 421, at the substation, at armature 463 opens the circuit for relay 432, thereby preventing the starting of the system from the substation due to an automatic operation which takes place thereat. The deenergization of relay 421 also opens the energizing circuit for relay 422 at its armature 496, but the relay 422 being a slow-release relay will remain energized for an interval of time after its energizing circuit has been opened. After an interval of time, however, relay 422 deenergizes and operates its armature 495 to engage its back contact and an energizing circuit is thereupon completed for the relay 423 from negative side of battery through the winding of the relay 423, conductor 497, back contact and armature 495, and the back contact and armature 465 to the positive side of battery. As a result of the energization of the relay 423, the signalling lines 234 to 237 which are normally held open at the armatures 482, are now extended over the armatures 482, 484 and 469 to the control code-receiving relays 301 to 308, inclusive.

It will be understood that in practice the circuits are so arranged that the connection through to the code transmitting relays 216 to 223 occurs approximately at the same time or slightly after the connection through to the control code-receiving relays 301 to 308, is completed. A circuit is now completed extending from positive battery at relay 223 over the front contact and its first armature, through the front contact and first armature of the armature group 292, the front contact and first armature of armature group 293, the back contact and first armature of the group 295, conductor 234, the first armature and the back contact of group 476, the first armature and its front contact of the group 482, the first armature and its back contact of the group 484, the first armature and its back contact of the group 469, conductor 498, the windings of the polar receiving relays 308, 307, 305 and 306 in series, conductor 499, the second armature and its back contact of the group 469, back contact and third armature of the group 484, front contact and second armature of the group 482, back contact and second armature of the group 476, conductor 235, the second armature and its back contact of the group 295', second armature and front contact of the group 293, the second armature and its front contact of the group 292, the first armature and its back contact of the relay 221 and the armature of relay 220 and its front contact to negative battery.

It will be noted that receiving relays 305, 306, 307 and 308, were connected in this circuit, however, the direction of current is such that only relays 305 and 308 are operated to move their armatures to the opposite positions from that shown.

It will be readily understood that similarly any number of code combinations may be transmitted over the signalling lines. Thus, for example, a positive impulse may be transmitted over the first line and a negative over the second, third or fourth lines; a positive over the second line and over either the third or four lines, a positive over the third line and a negative over the fourth. To extend the combinations, I can send a positive over the first and second lines and a negative over the third or fourth, a positive over the first and third and a negative over the fourth and so on. It will be clear from the above, that inasmuch as I can use either just two of the lines or any number up to all of them and with any combination of polarities so that with the four lines at least fifty combinations are possible.

The following table shows the various code combinations that may be transmitted over the signalling lines as described in the preceding paragraph.

*Signalling lines used*

| 1st | 2nd | 3rd | 4th | 1st | 2nd | 3dr | 4th |
|-----|-----|-----|-----|-----|-----|-----|-----|
| +   | −   |     |     | −   | +   |     |     |
| +   |     | −   |     | −   |     | +   |     |
| +   |     |     | −   | −   |     |     | +   |
|     | +   | −   |     |     | −   | +   |     |
|     | +   |     | −   |     | −   |     | +   |
|     |     | +   | −   |     |     | −   | +   |
| +   | +   | −   |     | −   | −   | +   |     |
| +   | +   |     | −   | −   | −   |     | +   |
| +   |     | +   | −   | −   |     | −   | +   |
|     | +   | +   | −   |     | −   | −   | +   |
| +   | −   | +   |     | −   | +   | −   |     |
| +   | −   |     | +   | −   | +   |     | −   |
| +   |     | −   | +   | −   |     | +   | −   |
|     | +   | −   | +   |     | −   | +   | −   |
| −   | +   | +   |     | +   | −   | −   |     |
| −   | +   |     | +   | +   | −   |     | −   |
| −   |     | +   | +   | +   |     | −   | −   |
|     | −   | +   | +   |     | +   | −   | −   |
| +   | +   | +   | −   | −   | −   | −   | +   |
| +   | +   | −   | +   | −   | −   | +   | −   |
| +   | −   | +   | +   | −   | +   | −   | −   |
| −   | +   | +   | +   | +   | −   | −   | −   |

As a result of the energization of relay 305 an energizing circuit is completed for relays 311 and 427, which extends from negative battery, winding of relay 311, upper contact and armature of the relay 305, conductor 499' and through the winding of the relay 427 to positive battery. Relays 427 and 311 are energized in series over this circuit. Relay 311 operates its bank of armatures 311a to 311d, into engagement with their front contacts. The armatures of relays 309 to 312, are connected in pyramidal relation, which is an arrangement well known in the art.

As a result of the energization of relay 308, a circuit is simultaneously completed for the relay 316 from negative battery through the winding of the relay 316, the lower contact and armature of the relay 308 and conductor 499' and the winding of the relay 427 to positive battery as traced above. Relay 316 upon energization operates its group of armatures 316a to 316g, into engagement with their front contact members.

As a result of the energization of relay 316, a circuit is completed from positive battery through the armature 313a and its back contact, through the armature 314b and its back contact, through the armature 315d and its back contact armature 316g and its front contact, and through the winding of the relay 317 to negative battery.

Relay 317, upon energization, actuates its armatures 317a to 317f into engagement with their front contacts and completes the final operating circuit for the point selecting relay 327 from negative battery through the winding of the relay 327 to the armature 317f and its front contact, armature 312f and its back contact, armature 311d and its front contact, armature 310b and its back contact, and armature 309a and its back contact to positive battery.

Relay 327 upon energization, operates all of its contacts 372 to 378 to their closed position. At the first contact 378 an energizing circuit is completed for the relay 431 from negative battery through the winding of relay 431, conductor 410, the contacts 378, front contact and armature 317f and armatures 312f, 311d, 310b and 309a, as traced above, to positive battery.

Relay 431 energizes and at its armature 493 prepares a locking circuit for itself and for relay 327. At armature 494 it opens a possible energizing circuit for the relay 432 and at armature 492 it prepares an energizing circuit for the relay 426 from negative battery through the winding of the relay 426 to the armature 492 and its front contact, and the back contact and armature 465', and back contact and armature 467 but this circuit is held open at the back contact and armature 467 of relay 427 energized.

Referring now to the dispatcher's office, it will be recalled that during the interval following the energization of relay 225 and before slow-release relay 226 has a chance to deenergize, relay 227' was energized and the above described control code was transmitted.

After an interval, slow-release relay 226 deenergizes and opens the energizing circuit of slow-release relay 227'. Relay 227' denergizes after an interval opening the control code circuit at armatures 292 and preparing the supervisory receiving circuits to armatures 290.

However, slow-release relay 229 has also been energized by relay 227' at armature 291 and accordingly the supervisory circuits are still held open at armatures 290 until relay 229 denergizes. An interval is thus provided after the opening of the control code circuit before the supervisory code receiving circuit is completed. During this interval the operations preparatory for the transmission of the supervisory code combination now to be described are completed.

As a result of the opening of the control code circuit, the relays 308 and 305 which were operated are deenergized and their armatures return to their normal position as shown. Relays 311, 316, 317 and 427 are accordingly deenergized.

As a result of the deenergization of relay 427, an energizing circuit is completed for relay 426 from negative battery through the winding of relay 426, armature 492 and its front contact, back contact and armature 465' and back contact and armature 467 to positive battery. Relay 426 holds the control code receiving circuit open at armatures 469. A further result of the deenergization of relay 427 is to open the energizing circuit for relay 428 at armature 467.

After the deenergization of slow-release relay 428, an energizing circuit is completed for the relay 424 from negative battery through the winding of relay 424, the front contact and armature 468, back contact and armature 487, back contact and armature 490, front contact and armature 491 to positive battery. Relay 424 upon operation actuates its bank of armatures 484 into engagement with their front contacts in preparation for transmitting a checking code indicative of the selection which has been made, and, at armature 486, an energizing circuit is prepared for the relay 429 which, however, is not effective at this time.

Referring again to the effect of the operation of the point selecting relay 327, as a further result of the energization of this relay energizing circuits are completed for a combination of the check or supervisory code-sending relays 411 to 418 as follows. From positive battery through the winding of the relay 412 and the conductor connected thereto, through the contact 374 and the winding of the relay 417 to negative battery.

A multiple circuit may be traced from the winding of the relay 412 over the circuit traced above through the contact 372 and the winding of the relay 413 to negative battery. Another multiple circuit may be traced over the contact 373 and through the winding of the relay 415 to negative battery. In accordance with these energizing circuits, relays 412, 413, 415 and 417, are energized and prepare at their armatures, circuits for the transmission of a supervisory, or checking code indicative of the selection which has been made.

At the dispatcher's office it will be recalled that the relay 227' was denergized and in turn opened the energizing circuit for slow-release relay 229. Slow-release relay 229 now deenergizes and prepares the receiving apparatus at the dispatcher's office for operation in accordance with the check circuit.

It will be recalled that the relays 412, 413, 415 and 417 were energized to determine the supervisory check circuit code which may now be traced as follows; from positive battery through the front contact and armature of the relay 412, over the front contact and last armature of the group 484, the front contact and fourth armature of the group 482, back contact and fourth armature of group 476, conductor 237, the fourth armature and back contact of the group 295, the fourth armature and its front contact of the group 293, the fourth armature and its back contact of the group 292, the fourth armature and back contact of the group 290, the windings of relays 151, 147, 146 and 150, the third armature and its back contact of the group 290, third armature and its back contact of the group 292, third armature and its front contact of the group 293, third armature and its back contact of group 295, conductor 236, the third armature and back contact of the group 476, the third armature and front contact of the group 482, the fourth armature and front contact of the group 484 to the armature and back contact of the relay 414, the armature and front contact of the relay 413 to negative battery.

Multiple circuits of those traced above extend through the relays 151 and 147 to the relays 145 and 149 over the armatures of the groups 290, 292, 293, 295, conductor 235, armatures 476, 482, 484, armature of relay 416 and its back contact and armature of relay 415 and its front contact to negative battery. A further multiple circuit may be traced through the relays 144 and 148 in series, armatures 290, 292, 293, 295, conductor 234 through the armatures of group 476, 482, 484, armature of the relay 418 and its back contact and the armature of relay 417 and its front contact to negative battery. Only the relays 151, 146, 145 and 144 receive the correct polarity to cause their respective armature operations. The remaining relays 147, 148, 149 and 150 are not operated.

As a result of the energization and operation of relay 144, an energizing circuit is completed for the relays 124 and 232 from negative battery through the winding of the relay 124 to the upper contact and armature of relay 144, conductor 152 and winding of the relay 232, to positive battery. A multiple circuit is also completed for the relay 123 from negative battery through the winding of the relay 123, upper contact and armature of relay 145, conductor 152, and the winding of relay 232 to positive battery. A circuit is also completed for the relay 122 from negative battery through the winding of the relay 122, the upper contact and armature of the relay 146, conductor 152 and the winding of the relay 232 to positive battery, As a result of the energization of relay 151 an energizing circuit is completed for the relay 140 from negative battery through the winding of the relay 140 to the lower contact and armature of relay 151 conductor 152 and the winding of relay 232 to positive battery.

The relays 122 to 124, upon energization, operate their respective armatures which are shown on the same level with these relays. As a result of the energization of relay 140, the armature 140a shown on the same vertical plane with this relay is operated to engage its lower contact and completes an energizing circuit from positive battery through this armature 140a in engagement with its lower contact to armature 139a and its upper contact, armature 138b and its upper contact, armature 137c and its back contact, and through the winding of the relay 131 to negative battery. However, as will appear hereinafter, the energization of relay 131 has no effect as the necessary combination is set up by the other three relays 122 to 124.

Relays 122 to 124, upon operation, complete a circuit from positive battery the armature 121a its back contact, the armature 122b and its front contact, the armature 123c and its front contact the armature 124d and its front contact and through the winding of the point selecting relay 118 to negative battery and in multiple through check lamp 108. Check lamp 108 is thereupon illuminated and indicates that the point selection made at the remote substation in accordance with the control code previously transmitted.

Point selecting relay 118, upon energization, completes an energizing circuit for the relay 227 from negative battery through the winding of the relay 227, through the contact 168 over the circuit including the armatures 124d, 123c, 122b and 121a to positive battery. Relay 227, upon energization, establishes its own holding circuit at armature 284, and at armatures 285 prepares a multiple circuit for relay 229 which, however, is open at armature 288 and at armature 286 prepares a circuit for relay 233 now held open at armature 287' and at armature 287 it prepares a circuit for conductor 237.

The operator upon noting the illumination of lamp 108, releases the key 107, thereby restoring relays 220 and 223. Relay 225 previously locked over armature 270 is now locked over an energizing circuit for the relays 225 and 298 in series from positive battery through the key 212, the winding of the relay 298, armature 275 and its front contact, back contact and armature 272 and through the winding of the relay 225 to negative battery. Relays 298 and 225 are energized in series over this circuit. Relay 225 can now be deenergized only upon the operation of the releasing key 212 or by depressing another point selecting key, as will appear hereinafter.

During the above described operation, relay 232 which was described as operated in series with the relays 122 to 124 and 140, is energized and operates to complete an obvious energizing circuit over its armature 288 and front contact for the slow-release relay 231 which upon energization opens a possible energizing circuit for the relay 233 at its armature 287'.

During the time while the above described operations occurred at the office in response to the code transmitted from the substation indicating the selection made, similar restoring operations have been taking place at the substation.

It will be recalled that relay 424 was energized for the transmission of the check code. At the first armature of relay 424, a reenergizing circuit is completed for relay 428, which, upon energization, opens the energizing circuit for relay 424 at armature 490. Relay 424, being a slow relay, does not immediately permit its armatures to drop back, and therefore, an energizing circuit is completed while relay 424 is still in operated condition and relay 428 is energized, for relay 429. This circuit extends from negative battery through the winding of the relay 429, front contact and armature 486, front contact and armature 490, and the front contact and armature 491 to positive battery. Relay 429, upon energization, locks itself through the armature 488 and its front contact, back contact and armature 465' and the back contact and armature 467 to positive battery and at armature 487 prepares an energizing circuit for the relay 425.

After the deenergization of relay 424, relay 428 is deenergized at the first armature contact of relay 424. After slow-release relay 428 permits its armature 490 to drop to its back contact, an energizing circuit is completed for the relay 425 from negative battery through the winding of the relay 425, front contact and armature 487, back contact and armature 490 and the front contact and armature 491 to positive battery.

Relay 425 upon energizing, operates its armatures 480 and 481 to their front contacts and the group of armatures 476 to their front contacts switching the signalling line to the alternate position shown, thereby disconnecting them from either the control code circuits or the checking circuits as traced above.

Relay 425, upon energization, also completes a locking circuit for itself at armature 480 from negative battery, through the winding of relay 425, armature 480 and its front contact and back contact and armature 490, and front contact and armature 491 to positive battery and at armature 481 completes an energizing circuit for the relay 433 from positive battery, front contact and armature 481 and to the winding of the relay 433 to negative battery. Relay 433, upon energization, opens the energizing circuit of the relay 423 at the armature 465, opens the energizing circuit of the relay 426, traced above, at armature 465' and the locking circuit of the relay 429 at armature 465'.

Relay 423, upon deenergization, again opens the circuits of the conductors 234 to 237 from either the check or code control circuits and prepares the original holding circuit over the third and fourth armatures of the group 482, traced above. Relay 426, upon deenergization, again prepares the receiving code control circuit at its group of armatures 469 and relay 429 at its armature 487 again prepares a circuit for the relay 424 for any subsequent cycle of operation.

Before, however, relay 428 has had a chance to deenergize, relay 475 is energized over a circuit from negative battery through the winding of the relay 475, front contact and the fourth armature of the group of armatures 476, conductor 237, the fourth armature and front contact of the group of armatures 295 and front contact and armature 287 to positive battery which provides a return circuit over the front contact and armature 295, the conductor 236 acting as a common return and which, at the substation, is also connected to positive battery at armature 476 and its front contact. Relay 431 is accordingly held locked at armature 475'.

Both the control and supervisory ends of the systems are now connected through for the control operation of the selected unit and for supervision, utilizing the lines 234 and 235 for control and supervision respectively, the line 237 for holding circuit and line 236 for the common return circuit.

In order to close the circuit breaker, the dispatcher will now depress the master control key 211 to close its contacts. A circuit is now completed from positive battery at the point selecting relay 118 through contact 167 now closed over the upper contact of the closed operating key 106, through the lower closed contact of the master control key 211, back contact and armature 255, back contact and armature 260, through the closed contact 166 of the point selecting relay 118, front contact and second armature of the bank 295, conductor 235, the second armature and its front contact of the group 476, contact 375 of the point selecting relay 327, armature 379 and its back contact and through the winding of the relay 330 to negative battery.

Relay 330 is energized and at its armature 383 closes an obvious energizing circuit for the closing solenoid 333. Closing solenoid 333 upon operation, operates its circuit breaker to the closed position. As a result of the closing of the breaker an obvious energizing circuit is completed over the pilot contact of the breaker 331 and through the relay 334. Relay 334, upon energization, operates its armature 379 from its back contact to its front contact preparing an energizing circuit for the tripping relay 329. The operation of relay 334 at armature 381 closes an obvious circuit for relay 336, which energizes and locks itself over armature 336'.

As a result of the movement of armature 380 to its front contact, positive battery is removed therefrom and negative battery is connected through its front contact which extends over the contact 376, front contact and first armature of the group 476, conductor 234, first armature and front contact of the group 295, contact 165 of the point selecting relay 118, armature 163 at its back contact and through the relay 242 to positive battery.

Relay 242, upon energization completes an energizing circuit for the supervisory relay 116 from positive battery through the winding of the relay 116, contact 164, armature 257 and its front contact and armature 252 and its back contact to negative battery. Relay 116 is energized and locks itself over its armature 162, and, at armature 161, it opens the energizing circuit for illuminating the lamp 103 which has been indicating the tripped condition of the breaker. At the front contact of armature 161, it closes a circuit for the lamp 104 indicating a closed condition of the breaker, and, at armature 163, it switches the supervisory circuit from the relay 242 to the relay 243 to be operated thereafter in accordance with the trip condition of the breaker. The relay 242 upon energization also operates its armature 256 to its front contact for holding the positive battery circuit closed to conductor 297 at the dispatcher's office until all of the operations described above have been completed.

The dispatcher has now completely operated a unit and has received a supervisory indication of the operation of that unit. It may happen that the breaker was closed on a short circuit and will immediately trip. Unless the closing circuit is opened, the breaker will reclose, causing pumping of the breaker which is very undesirable. This condition is prevented by the energization of relay 242 which completes an energizing circuit for the relay 244 from negative battery through the winding of the relay 244, armature 258 and its front contact through the upper contact closed of the individual operating key 106 and through the contact 167 to positive battery. Relay 244, upon energization, locks itself over its armature 259 and at armature 260 opens the energizing control circuit to the breaker described above, thus, preventing automatic pumping in the event that the breaker should trip out on a short circuit as the locking circuit for relay 244 is made independent of supervisory relay 242.

In order to restore the apparatus to normal, the operator will now operate the non-locking release key 212 opening the locking circuit of the relays 225 and 298. Relay 225, it will be recalled, was locked in series with relay 298 and over the contact of the release key 212. Relay 225, upon deenergization, in turn opens the locking circuit for the relay 227 at armature 274 and also the locking circuit for relay 118 at this same armature and the point selecting relay 118 and relay 227 accordingly drop out.

The release of the point-selecting relay 118, opens the locking circuit of the relay 244, which, again, at its armature 260, prepares the control circuit for operation. Deenergization of the relay 227 opens the energizing circuit of the relay 233 at armature 286, and, at armature 287 opens the normal holding circuit traced above for the relay 475. At armature 285, the energizing circuit of the relay 229 is opened and after an interval of time this relay drops its armatures 290 to their back position in preparation for the next supervisory operation.

The deenergization of relay 475 opens the locking circuit of the relay 431 and the energizing circuit of the point selecting relay 327, which, upon releasing opens the selecting circuit completed to the circuit breaker 331. The deenergization of relay 431 in turn opens the locking circuit of relay 425 at the armature 491 and the normal holding circuit, for the relay 421 at the substation and relay 224 at the office, is again completed.

Relay 224 upon energization again completes an energizing circuit for the relay 226, and, relay 421 upon energization completes the energizing circuit for relay 422. The slow-release relay 228, the circuit of which was opened upon deenergization of relay 233 at armature 294, and relay 433 the circuit for which was opened at armature 481 upon deenergization of relay 425, now deenergize after an interval of time and the apparatus is restored to normal.

If the dispatcher, instead of depressing the release key 212 operates another point selecting key such as 206, an energizing circuit is completed for the relay 298' from negative battery through the winding of the relay 298' front contact and armature 270 and to the front contact of any one of the relays 216 to 223, inclusive, which have been energized in accordance with the individual-point-selecting key which is operated in the manner described hereinbefore in connection with key 107. Upon energization of relay 298', the locking circuit for the relays 225 and 298 is opened at armature 272 and these relays are restored to normal in turn restoring the circuits to normal as described hereinbefore.

Relay 298' upon energization completes a locking circuit for itself over the front contact and armature 271, the front contact and armature 280 to positive battery. When, however, relay 228 is deenergized, as a result of the restoration of the apparatus described above, relay 298' is deenergized and the above described circuit for relay 225 is again completed thereby initiating a new connection. Operations then continue as described hereinbefore.

Summarizing the operations thus far described, it will be noted that, normally, the lines 234 and 235 are open circuited at armatures 293, at the dispatcher's office, and at armature 482, at the substation, while the conductors 236 and 237 are connected over the back contacts of armatures 293 to the line relay 224, at the office, and over the back contact of armatures 482 to the line relay 421, at the substation.

It will also be noted that the receiving apparatus including relays 144 to 151, at the office, are normally prepared for receiving supervisory codes over the armatures 290 which are normally in engagement with their back contacts, armatures 292 normally in engagement with their back contacts and armatures 295 normally in engagement with their back contacts. The only operation necessary to complete this circuit is the engagement of the armatures 293 with their front contacts.

At the substation, the control code receiving relays 301 to 308 are also normally in condition for receiving supervisory codes over the armatures 469 in engagement with their back contacts, armatures 484 in engagement with their back contacts and armatures 476 in engagement with their back contacts, the only operation necessary to complete the circuit to these relays being the operation of armatures 482 to engage their front contacts.

When the operation is started at the dispacher's office in response to the closing of a key, the control code generating relays 216 to 223 are operated in various combinations depending upon the point selecting key which is operated. The relay 225 is thereupon operated which opens the circuit for the normal holding relay 224 at the armature 273, and prepares a circuit, at armature 275, for the subsequent energization of relay 298. Relay 225 locks itself over armature 276, and at armature 277, completes a circuit for the relay 227' which switches the line circuits connected over armatures 292 from the receiving relays to the armatures of relays 216 to 223 for the transmission of the supervisory code.

It will be noted that the circuit for the relay 227' is completed over an armature of the relay 226 which latter relay is of the slow-release type. As a result of the deenergization of the line relay 224, relay 227' accordingly remains energized only a short period of time, this period being sufficiently long, however, to permit the transmission of the control selecting code. The operation of the relay 226 opens the energizing circuit of relay 227' and also completes an energizing circuit for the relay 241 at which point the control code circuit is completed over the lines 234 to 237.

At the substation, the deenergization of the line relay 421 deenergizes the relay 422 which energized the relay 423. This is the only operation necessary to complete the control code receiving circuit through to the relays 301 to 308. The relays 301 to 308 are, accordingly, operated in accordance with the control code received depending upon the operation of relays 216 to 223 and these in turn select one of the point-selecting relays, such as 327 for operation.

Energization of the point-selecting relay 327, at the substation, controls the energization of combinations of the supervisory code transmitting relays 411 to 418 and also the energization of relay 431. Relay 431, at its armature 492, in turn completes an energizing circuit for the relay 426 which opens the supervisory circuit. In other words, as soon as the point selection is made, this is made evident by the energization of relay 426. Energization of relay 426 in turn completes an energizing circuit for the relay 424 which at one of its armatures energizes relay 428 and also holds relay 426 energized, and, at its other armatures, switches the signalling lines 234 to 237 to the contacts of relays 411 to 418 for transmitting a supervisory check code indicative of the selection which has been made.

These operations are timed so as to occur by the time that relay 227' at the office has deenergized, or opened, as indicated above, to reconnect the relays 144 to 151 to the signalling lines over the armatures 290 and their back contacts and the armatures 292 and their back contacts. These supervisory check codes are now received and invariably operate the relays 144 to 151 to effect a point selection in accordance with the point selection made at the remote station. Relay 118, in this case, is operated to prepare the final control and supervisory circuits.

The operation of the relay 118 at the office energizes the relay 227 which at its armature 285 prepares an energizing circuit for the relay 229 which would be energized except for the energized condition of relay 232. Relay 232 has been previously energized in accordance with received supervisory code which in turn had already energized relay 231 opening, at armature 287', the possible energizing circuit for the relay 233. Relay 233, however, is later energized for finally completing the control and supervisory circuits.

At the substation end, the energization of relay 424 also completes an energizing circuit for relay 429 which in turn opens an energizing circuit for the relay 424 so that after an interval, relay 424 deenergizes, reswitching the signalling lines to the supervisory receiving relays 301 to 308 and disconnecting the supervisory code transmitting relays 411 to 418. The opening of the code transmitting circuits at the substation end causes the deenergization of relay 232 at the office end, which, upon deenergization in response to this operation, indicates that the code operations have been completed, and, at its armature 288, completes an energizing circuit for the relay 229 which again disconnects the relays 144 to 151 from the supervisory circuit and deenergizes the slow-release relay 231.

After an interval of time, the relay 231, upon deenergization, completes the energizing circuit for the relay 233 which finally switches the signalling lines 234 and 235 for the control and supervisory circuits, respectively, and conditions the line 237 for the transmission of an energizing current for the relay 475 and the line 236 is made a common return line by being connected to positive battery at armature 295.

At the substation, the energization of relay 475 in turn maintains a locking circuit for the relay 431 and the deenergization of the relay 428, in response to the deenergization of the relay 424, in turn completes an energizing circuit for the relay 425 to complete the final operating circuits.

Control operations may now take place over the conductor 235 and supervisory operations over the conductor 234, after which the apparatus may be restored to normal.

Thus, it will be seen that the signalling lines 236 and 237 are normally employed as holding lines and that all four conductors 234 to 237 are thereafter utilized for the transmission of control and supervisory codes for making point selections and checking the point selections. Thereafter, the conductors 234 and 235 function as the supervisory control code and signalling lines, respectively, while conductor 236 functions as a common return line and conductor 237 as a holding line during these operations.

It will also be noted that the circuits are normally connected through for the transmission of the control codes and are disconnected and connected through for a supervisory code an interval thereafter sufficiently long for the control code to be effective, while at the substation end, the point selection itself controls the switching of the signalling lines for transmission of the check codes. The check code when received at the office end, in turn operates a point-selecting relay, which, upon operation, controls the final connection through of the signalling line for making the control and supervisory operations after which the selecting apparatus may be restored to normal.

In supervisory control systems, any one of a plurality of breakers may operate automatically at any time and as a matter of fact, a plurality of these may operate simultaneously or at least during the period while a supervisory code of one of the breakers is being transmitted to the office. Accordingly, provision must be made not only to transmit back a supervisory code in response to an automatic operation but also to store up such operations by proper mechanism in the event that an operation occurs during the period while a code for a previous operation is being transmitted so that the stored up code may be transmitted following the completion of the transmission for the previous operation.

To this end, each breaker is provided with two relays 334 and 336 and associated with the breakers is the group of relays 404 to 408. Relays 334 and 336 store the supervisory signal in case the system is occupied by other operations at the time. When a breaker is in the tripped position, its relays 334 and 336 are both deenergized, and when the breaker is in the closed position these relays are both energized. However, when the breaker changes automatically from the tripped to the closed position, only 334 is at first energized until the associated point selecting relays 327 is operated, at which time relay 336 is also energized. In a like manner, when the breaker changes automatically from the closed to the tripped position, at first only relay 334 is deenergized until the point-selection relay 327 is energized, at which time relay 336 is also deenergized.

Each of the relays 404 to 408 is common to and associated with a group of ten breakers individual thereto and are so arranged that, in the event of an operation of one of the breakers in a group, the other relays 404 to 408 individual to other groups are rendered non-effective for an interval of time while the code for the previous operation is being transmitted. Further means is provided whereby if more than one breaker in a single group operates, these operations are also stored as will appear from the detailed description to follow.

It will be assumed that the breaker 331 is in the closed position, as described above, and automatically trips to the open position as shown. With the breaker in the closed position, relay 334, as has been described is energized over the pilot contact of the breaker. When now the breaker trips to its open position, relay 334 is deenergized and operates its armatures to engage their back contacts. It will also be noted that relay 336 was previously energized over point selecting contact 377 while the breaker was closed. Relay 336, upon energization, was locked over its first armature 336'. In this condition relay 336 held its armature 387 in engagement with its front contact and relay 334 held its armature 388 in engagement with its front contact. When, however, relay 334 is deenergized in response to the opening of the breaker as described above, armature 388 moves to engage its back contact and a circuit is thereupon completed for energizing the relays 432 and 408 in series. This circuit extends from positive battery through the armature 464 and its back contact, through the winding of the relay 432, armature 463 and its front contact, back contact and armature 494, armature 388 and its back contact, front contact and its armature 387, the winding of the relay 408, through the back contact of its own armature, the back contact and second armature of the relay 404, back contact and second armature of the relay 405, back contact and second armature of the relay 406, back contact and second armature of the relay 407 and back contact and second armature of the relay 408 to negative battery. Relay 408 and relay 432 are energized over this circuit and are thereupon locked over the front contact and second armature of the relay 408 to negative battery.

As a result of the operation of relay 408, the energizing circuits for any other of the relays 404 to 407 is opened by removal of negative battery at the second armature of relay 408. An energizing circuit is also completed for the point-selecting relay 327 from negative battery through the winding of the relay 327, armature 386 and its front contact, back contact and armature 385 through the fourth armature and its back contact of the relay 339, the back contact and first lower armature of the relay 338 and all similar armatures of breaker relays in this group and the front contact and third armature of the relay 408 to positive battery. Inasmuch as no other of the relays 403 to 407 can be energized at this time, no other point-selecting relay of another group of breakers can be energized. It will also be noted that the energizing circuit for relay 327 extends through the armatures of the individual relays of succeeding breakers in the same group so that only one point-selecting relay in the same group can be energized.

If, for example, the circuit breaker associated with relays 338 and 339 has operated, the energizing circuit for relay 327 traced above would not have been completed and instead the energizing circuit for relay 328 would have been completed. In such case the supervisory code for this point selection would have been transmitted to the office and relay 336 would have remained energized until the end of the transmission of this breaker signal whereupon, after restoration to normal, relay 327 would have energized. It will be understood from the above description that the signal is stored until the deenergization of relay 336 which terminates the storing operation.

Assuming energization of relay 327, its armatures 372, 373 and 374 are operated and complete energizing circuits for the supervisory code transmitting relays 412, 413, 415 and 417 in a manner which has been described in detail hereinbefore. As a result of the energization of these latter relays, a code impulse is prepared for transmission to indicate the selection which has been made for thereafter operating the supervisory signals in accordance with the operation of the breaker.

As a result of the energization of relay 432, a locking circuit is completed therefor over the armature 462 and its front contact and the relay remains energized independently of the relay 421. A further result of the energization of the relay 432 is to open the holding circuit for the relay 421 at armature 461 and its back contact, which, as will be recalled, completed the return circuit for the normal holding circuit. Relays 421 and 224 at the office are thus deenergized and upon deenergization of these two relays the circuits traced above are again completed for transmitting the supervisory codes. Thus, at the office end, the deenergization of the relay 224 opens the energizing circuit of the relay 225 which in turn prevents any possible energization of the relay 227' at armature 277 so that even though a control key is operated, its operation cannot effect the transmission of the supervisory code, which will now continue as will be described hereinafter. The deenergization of the relay 226 also transfers the circuit which formerly was traced to the relay 227', to the relay 241 which is thereupon energized over a circuit from negative battery through the winding of the relay 241, back contact and armature 282 and the back contact and armature 281 to positive battery. Relay 241, upon energization, operates its armatures 293 to their front contacts, further opening the holding circuit of the relays 224 and 421 and transferring the circuit, at the office end of the conductors 234 to 237, to the armatures 292, which, in turn, extend the circuits through the armatures 290 to the supervisory receiving relays 144 to 151.

At the substation, the deenergization of the relay 421 opens the energizing circuit of the relay 422 and this relay after an interval of time completes an energizing circuit for the relay 423 over the circuit traced in detail hereinbefore. Relay 423, upon energization, operates its armature 482 thereby switching the signalling lines 234 to 237 to the armatures 484.

A further result of the energization of selecting relay 327 is to complete an energizing circuit for the relay 431 over the contact 378 as traced in detail hereinbefore. Relay 431, upon energization, completes a locking circuit for itself over armature 493 and its front contact and armature 466, and, at armature 494, opens the locking circuit of the relays 432 and of relay 408. At armature 492, it completes an energizing circuit for the slow-release relay 426 from negative battery through the winding of the relay 426, armature 492 and its front contact, back contact and armature 465', back contact and armature 467 to positive battery. Relay 426 energizes and operates its armatures 469 to open the circuits to the supervisory receiving relays 301 to 308.

A further result of the energization of relay 431 is to complete a circuit from positive battery through the armature 491 and front contact, armature 490 and its back contact, armature 487 and its back contact, armature 468 and its front contact and through the winding of the relay 424 to negative battery. Energization of relay 424 switches its armatures 484 to the supervisory code transmitting relays 411 to 418. The supervisory circuits for transmission of the code set up by the relays 411 to 418 are now completed for operating the relays 144 to 151 in a manner which has been described in detail hereinbefore in connection with the supervisory circuit operations.

Relays 144 to 151, upon operation, in turn control the selecting relays 121 to 124, 137 to 140 and 125 to 134 which set up a point-selecting relay, such as relay 118, for operation. Point-selecting relay 118 in this particular case will be selected and upon the operation of its contact, a supervisory circuit will be prepared for transmission over the conductor 234 in a manner which has been described hereinbefore.

When the point selecting relay 327 is operated as described above, a circuit is completed for short-circuiting the winding of relay 336 over contact 377, and armature 381 and its back contact to positive battery. Relay 336 thereupon deenergizes.

Upon deenergization of relay 336 at the substation, the energizing circuit for relays 432 and 408 is opened and these relays are deenergized. The circuit for these relays is also opened by relay 431 to prevent energization of any other point selecting relays until the set is restored to normal.

It will be noted that in the case of a supervisory operation only, the relay 225 was not energized at the office. Accordingly, the apparatus is restored to normal by opening the holding circuit of relay 227 upon release of either relay 242 or 243. Deenergization of relay 227 initiates restoration of the apparatus in the manner described above. Since relays 242 or 243 release as soon as the supervisory relay 116 has actually changed its position to agree with that of the supervised device, it will be seen that the set restores as soon as permissible, but not before the supervisory signal has actually been transmitted to the office.

If in the meantime, another breaker has changed its position or if several breakers have changed their positions at the same time, the corresponding supervisory signals will be successively transmitted until all supervisory relays such as 116 are in accord with their associated breakers.

Although only control supervision of breakers are here shown for purposes of simplicity, it will be clear to those skilled in the art that other control operations may be performed. Thus for example, inasmuch as clear through-circuits are provided from an individual key to the circuit breaker operating magnet and a supervisory circuit is completed directly from the breaker to the supervisory receiving relay, direct control of a remote regulator may be obtained and metering may be carried on over the control or supervisory line or both. Similarly any other desired remote selective control may be carried out over my system.

I claim as my invention:

1. In a supervisory control system, a first station, a second station, a plurality of apparatus units at said second station, operating means individual to each of said apparatus units at said first station, code transmitting means at said first station variably operated in accordance with the operating means actuated, code-receiving means at said first station, code-receiving means at said second station, code-transmitting means at said second station, a plurality of signalling lines connecting said stations and disposed to have applied thereto direct current polarities in permutation by said code transmitting means, said signalling lines being normally conditioned for connection to said code-receiving means at each of said stations, means for providing a holding circuit over one of said signalling lines, means at said first station responsive to the operation of one of said operating means for opening said holding circuit and for switching said signalling lines so as to be associated with said code transmitting means at said first station, means responsive to the opening of said holding circuit for completing the circuit from said code transmitting means at said first station to said signalling lines whereby code combinations of impulses are transmitted over said signalling lines to the code receiving means at said second station, means at said second station responsive to the opening of said holding circuit for completing said circuits from said signalling lines to said code-receiving means thereat whereby said code-receiving means are operated in accordance with the code combination of impulses received, means controlled by said code-receiving means for selecting one of said apparatus units for operation, and means for operating said code-receiving means at said first station in response to the operation of said code-transmitting means at said second station initiated by the operation of said apparatus unit.

2. In a supervisory control system, a first station, a second station, a plurality of apparatus units at said second station, operating means individual to each of said apparatus units at said first station, code transmitting means at said first station variably operated in accordance with the operating means actuated, code-receiving means at said first station, code-receiving means at said second station, code-transmitting means at said second station, a plurality of signalling lines connecting said stations and disposed to have applied thereto direct current polarities in permutation by said code transmitting means, said signalling lines being normally conditioned for connection to said code-receiving means at each of said stations, means for providing a holding circuit over one of said signalling lines, means at said first station responsive to the operation of one of said operating means for opening said holding circuit and for switching said signalling lines so as to be associated with said code transmitter at said first station, means responsive to the opening of said holding circuit for completing the circuit from said code transmitter to said signalling lines whereby code combinations of impulses are transmitted over said signalling lines to the code receiving means at said second station, means at said second station responsive to the opening of said holding circuit for completing said circuits from said signalling lines to said code receiving means thereat, whereby said code-receiving means are operated in accordance with the code combination of impulses received over said lines, means controlled by said code-receiving means for selecting one of said apparatus units for operation, means at said second station responsive to said selection for variably operating said code-transmitting means thereat for generating code combinations of impulses to be transmitted, means responsive to the selection of the apparatus unit for switching said signalling lines from said code receiver at said second station to said code transmitter thereat, whereby check code combinations of impulses are transmitted over said signalling lines to said first station, means at said first station operated an interval after said control code has been transmitted for disconnecting said code transmitter thereat from said signalling lines and for connecting said code receiver thereat to said signalling lines, whereby said code receiver is operated in accordance with the check code transmitted from said second station, and means responsive to said code receiving means at said first station for operating an indicating device for indicating said remote selection.

3. In a supervisory control system, a first station, a second station, a plurality of signalling lines connecting said stations, a plurality of apparatus units at the second station, a plurality of selecting keys at the first station each individual to an apparatus unit, a code transmitter at the first station normally disconnected from said plurality of signalling lines and selectively responsive to the individual operation of the selecting keys for transmitting different polarity combinations of direct currents over said plurality of signalling lines, a code receiver at the second station normally disconnected from said plurality of signalling lines and selectively responsive to said different combinations of direct currents transmitted over said plurality of signalling lines for individually selecting said apparatus units, a normally energized holding circuit completed over one of said signalling lines, means responsive to the initiation of the transmitter into operation for opening said holding circuit, and means at each station responsive to the opening of said holding circuit for connecting the code transmitter and the code receiver to said signalling lines.

4. In a supervisory control system, a first station, a remote station, a plurality of signalling lines connecting said stations, a plurality of apparatus units at the second station, a transmitter at the first station normally disconnected from said plurality of signalling lines operable to transmit only direct current code combinations of different polarities individual to the apparatus units over said plurality of signalling lines, a receiver at the second station normally disconnected from said plurality of signalling lines and responsive only to said direct-current code combinations transmitted over said plurality of signalling lines to select apparatus units individual thereto, a normally energized holding circuit maintained over certain of said signalling lines, means at said first station operable in response to the operation of the transmitter for opening said holding circuit and for connecting the transmitter to the signalling lines, and means at the second station responsive to the opening of said holding circuit for connecting the receiver to the signalling lines.

5. In a supervisory control system, a first station, a second station, a plurality of signalling lines connecting said stations, a plurality of apparatus units at the second station, an operating key individual to each unit at the first station, code transmitting means at each station normally disconnected from said plurality of signalling lines and selectively operable to transmit different direct-current code combinations only of different polarities over said signalling lines, code receiving means at each station normally disconnected from said plurality of signalling lines and selectively responsive to direct-current code combinations only of different polarities transmitted over said signalling lines, a normaly energized holding circuit extending over certain of said signalling lines, means responsive to the operation of the code transmitting means at the first station for opening the holding circuit and for connecting the said code transmitting means to the signalling lines for a predetermined time and for thereafter connecting the code receiver at the first station to said signalling lines, means at the second station responsive to the opening of said holding circuit for connecting the code receiving means thereat to said signalling lines to select an apparatus unit individual to the code combination transmitted, and means at said second station responsive to said selection for disconnecting the receiver from the signalling lines and connecting the code transmitter thereto to transmit a code combination individual to the selected unit to operate the code receiver at the first station, and means responsive to the operation of said code receiver at the first station for selecting the operating key individual to the selected unit.

6. In a supervisory control system, a first station, a second station, a plurality of apparatus units at the second station, a plurality of signalling lines connecting the stations, a transmitter at said first station normally disconnected from the signalling lines and selectively operable to transmit different combinations of direct currents over said signalling lines simultaneously individual to said apparatus units, a starting relay at the first station responsive to the operation of the transmitter thereat, a receiver at the second station normally disconnected from the signalling lines and selectively responsive to said different combinations of direct currents transmitted thereover for selecting an apparatus unit individual thereto, and means at each station operated over certain of said signalling lines in response to the operation of the starting relay at the first station for connecting the transmitter and receiver to the signalling lines.

7. In a supervisory control system, a first station, a second station, a plurality of apparatus units at the second station, a plurality of signalling lines connecting the stations, a source of direct current at the first station, transmitter means at the first station normally disconnected from the signalling lines and selectively operable to transmit different code combinations of direct currents over said signalling lines individual to said apparatus units, switch means at the first station operable to connect the transmitter to the signalling lines, receiver means at the second station normally disconnected from the signalling lines and selectively responsive to the said different code combinations transmitted for selecting an apparatus unit individual thereto, switch means at the second station operable to connect the receiver to the signalling lines, and relay means at the first station responsive to the initiation of the transmitter into operation for effecting the operation over certain of said signalling lines of the said switch means at both stations to connect the transmitter means and the receiver means to the signalling lines.

8. In a supervisory control system, a first station, a second station, a plurality of apparatus units at the second station, a source of direct current at the first station, a plurality of signalling lines connecting said stations, a control key at the first station individual to each of said apparatus units, transmitting means at the first station normally disconnected from said signalling lines and selectively operable in response to the operation of said control keys to transmit different code combinations of positive and negative currents from said source over said signaling lines individual to said apparatus units, receiving means at the second station normally disconnected from said signalling lines and selectively responsive to said different code combinations for selecting an apparatus unit individual thereto, and relay means at said first and second stations controlled over certain of said signalling lines in response to the operation of the transmitting means at the first station for connecting the said transmitting and receiving means to the signalling lines.

9. In a signalling system, a first station, a second station, a plurality of apparatus units at said second station, a plurality of signalling lines connecting the stations, an operating means individual to each of said apparatus units at said first station, a normal holding circuit completed over one of said signalling lines, means for opening said holding circuit from either end of said signalling line in response to an operation of one of said operating means at said first station or in response to an operation of one of said apparatus units at said second station to condition the system for further operation, transmitting means at each station operable in response to the operation of the operating means at the first station or the operation of an apparatus unit at the second station to transmit code combinations of impulses over said signalling lines individual to said operating means and apparatus units, and receiving means at each station rendered operative in response to the opening of the holding circuit from the other station for substantially instantaneously selecting one of said apparatus units individual to the code combination of impulses when said code is transmitted from the first station or for substantially instantaneously selecting an operating means at the first station individual to a code combinaion of impulses transmitted from the second station.

10. In a supervisory control system, a first station, a second station, a plurality of apparatus units at said second station, a plurality of signalling lines connecting said stations, a source of direct current at the first station, a transmitter at the first station comprising a plurality of code transmiting relays normally disconnected from the signalling lines selectively operable to transmit different code combinations of positive and negative impulses of direct current only over said signalling lines simultaneously individual to said apparatus units, a selection key at the first station individual to each apparatus unit for selectively controlling the operation of the transmitter, a receiver at the second station normally disconnected from the signalling lines and selectively responsive to the said different code combinations transmitted over the signalling lines for substantially instantaneously selecting an apparatus unit individual to the said code combination transmitted, and means at each station including a normally energized holding circuit completed over certain of said signalling lines responsive to the operation of any one of the code transmitting relays at the first station for connecting the said transmitter and receiver to the signalling lines.

11. In a supervisory control system, a first station, a second station, a plurality of apparatus units at the second station, a plurality of line conductors connecting said stations, a normally energized holding circuit completed over certain of said line conductors, sending means at the first station normally disconnected from said line conductors and selectively operable to cause various combinations of direct currents only of opposite polarities to flow simultaneously over said signalling lines, each combination being individual to an apparatus unit, receiving means at the second station normally disconnected from said line conductors and selectively responsive to the said combinations of direct currents for selecting said apparatus units individual thereto, means at said first station operable in response to the initiating of the sending means into operation for opening the holding circuit, means at the first station responsive to the opening of said holding circuit for connecting said sending means to said line conductors for a predetermined time to transmit the said combinations of direct currents thereover, means at the second station responsive to the opening of the said holding circuit for connecting the receiving means to the line conductors to receive the said combinations of direct currents, and means at the second station responsive to the operation of the receiving means thereat for disconnecting said receiving means from the line conductors.

12. In a supervisory control system, a first station, a second station, a plurality of apparatus units at the second station, a plurality of signalling lines connecting said stations, a line relay at each station, a normally energized circuit completed over certain of said signalling lines for holding said line relays energized, a source of direct current at the first station, transmitting means at the first station normally disconnected from said signalling lines and operable to transmit different combinations of direct-current impulses only simultaneously over said signalling lines, operating means at the first station individual to said apparatus units operable to selectively control the operation of the transmitting means, means at the first station responsive to the operation of the transmitting means thereat for opening the holding circuit to deenergize the line relays at both stations, means at the first station responsive to the opening of the line relay thereat for connecting the transmitting means to the signalling lines, receiving means at the second station normally disconnected from said signalling lines and selectively responsive to the different combinations of direct-current impulses transmitted for selecting an apparatus unit individual to the transmitted combination of direct-current impulses, and means at the second station responsive to the opening of the line relay thereat for connecting the receiving means to the signalling lines.

HANS P. BOSWAU.